(12) United States Patent
Satran et al.

(10) Patent No.: US 7,094,007 B2
(45) Date of Patent: Aug. 22, 2006

(54) TANGENTIAL CUTTING INSERT AND MILLING CUTTER

(75) Inventors: Amir Satran, Kfar Vradim (IL); Danny Dagan, Nahriya (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/132,281

(22) Filed: May 19, 2005

(65) Prior Publication Data

US 2005/0214081 A1    Sep. 29, 2005

Related U.S. Application Data

(63) Continuation of application No. PCT/IL03/00757, filed on Sep. 22, 2003.

(30) Foreign Application Priority Data

Dec. 4, 2002    (IL) ..................................... 153252

(51) Int. Cl.
B23C 5/20    (2006.01)
(52) U.S. Cl. .......................... 407/113; 407/42; 407/48; 407/47; 407/61
(58) Field of Classification Search .................. 407/42, 407/48, 47, 61, 113, 102, 13, 104, 101
See application file for complete search history.

(56) References Cited

U.S. PATENT DOCUMENTS

| | | | |
|---|---|---|---|
| 3,142,110 A | 7/1964 | Hertel | |
| 3,490,117 A | 1/1970 | Hertel | |
| 3,694,876 A * | 10/1972 | Erkfritz | ........................ 407/48 |
| 4,074,949 A * | 2/1978 | Hochmuth et al. | .......... 407/114 |
| 4,294,566 A * | 10/1981 | Boone | ......................... 407/114 |
| 4,632,608 A | 12/1986 | Blomberg et al. | |
| 5,333,972 A | 8/1994 | Bernadic et al. | |
| 5,383,750 A | 1/1995 | Satran et al. | |
| 6,074,137 A | 6/2000 | Betman et al. | |
| 6,109,838 A | 8/2000 | Riviere | |
| 6,142,716 A | 11/2000 | Jordberg et al. | |
| 6,227,772 B1 | 5/2001 | Heinloth et al. | |
| 6,238,146 B1 | 5/2001 | Satran et al. | |
| 6,503,028 B1 | 1/2003 | Wallstrom | |
| 6,872,034 B1 | 3/2005 | Satran et al. | |
| 6,921,233 B1 * | 7/2005 | Duerr et al. | ................... 407/34 |
| 2003/0170080 A1 | 9/2003 | Hecht | |

(Continued)

FOREIGN PATENT DOCUMENTS

DE    WO 99/17899    4/1999

(Continued)

OTHER PUBLICATIONS

International Search Report for PCT/IL03/00757.

(Continued)

Primary Examiner—Monica Carter
Assistant Examiner—Sara Addisu
(74) Attorney, Agent, or Firm—Womble Carlyle

(57) ABSTRACT

A tangential milling cutting insert having two identical opposing end surfaces with two identical opposing major side surfaces of a generally parallelogrammatic shape and two identical opposing minor side surfaces extending between them. Each end surface has a peripheral edge containing cutting edges and four corners of which two diagonally opposed corners are lowered and the other two are raised. Each end surface is provided with an abutment member having an abutment surface. In each cross section of the cutting insert taken in a plane parallel to a minor plane of the cutting insert, the abutment surface is closer to the median plane than a respective leading section of a major cutting edge.

23 Claims, 6 Drawing Sheets

U.S. PATENT DOCUMENTS

2004/0202515 A1  10/2004  Satran et al.
2005/0063792 A1   3/2005  Satran

FOREIGN PATENT DOCUMENTS

EP        0 769 341       10/1996
JP        2001-062624      3/2001
WO        WO 96/35536     11/1996
WO        WO 97/17157      5/1997

OTHER PUBLICATIONS

International Preliminary Examination Report, PCT/IL03/00757 dated Jun. 23, 2004.

* cited by examiner

TANGENTIAL CUTTING INSERT AND MILLING CUTTER

RELATED APPLICATIONS

This is a Continuation of International Application No. PCT/IL03/00757, filed Sep. 22, 2003 and published in English as WO 2004/050283 A1 on Jun. 17, 2004. The contents of the above-identified international application are incorporated by reference.

FIELD OF THE INVENTION

The present invention relates to a tangential indexable cutting insert and a milling cutter for use in metal cutting processes in general and for milling a square shoulder in a workpiece in particular.

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

There is disclosed in EP 0 769 341 a face milling cutter employing a double-sided indexable tangential cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle. However, negative axial rake angles are disadvantageous, e.g., they have been found to be deficient in cutting efficiency for applications involving difficult to machine materials.

A double-sided indexable tangential cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. The cutting insert is left or right handed. It is manufactured to be right-handed and, when flipped around, is left-handed. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that will have an adverse effect on chip development and evacuation.

There is disclosed in WO 96/35536 a double-sided indexable tangential cutting insert which when mounted in a face-mill has a positive axial rake angle, even when the necessary clearance between the cutting insert and the workpiece is provided. This cutting insert presents two peripheral cutting edges for a right-hand face mill and two peripheral cutting edges for a left-hand face mill. In a side view (see FIG. 9) the cutting insert is generally rhomboidal in shape. The main cutting edges 10 of each end surface are parallel (see also FIGS. 7 and 8) to each other and to a centrally located protruding abutment member 12. The cutting insert is retained in an insert pocket with the abutment member of a non-operative end surface and an adjacent non-operative relief surface in abutment with respective support surfaces of the insert pocket. The abutment member of the non-operative end surface and the adjacent non-operative relief surface merge at an acute-angled mounting corner. In order to change the axial rake angle of the operative cutting edge, either the insert pocket has to be rotated, or a cutting insert having a mounting corner with a different mounting angle has to be used. In either case, a different milling cutter has to be used. Moreover, the axial rake and relief angles are interdependent and any change in the axial relief angle results in a corresponding change in the relief angle, which is not always desirable.

SUMMARY OF THE INVENTION

In accordance with the present invention there is provided a tangential cutting insert, for use in a milling cutter, comprising:

two identical opposing end surfaces of a generally rectangular shape in an end view of the cutting insert;

a peripheral side surface extending between the two opposing end surfaces, the peripheral side surface comprising two identical opposing major side surfaces of a generally parallelogrammatic shape, two opposing minor side surfaces and corner side surfaces located between adjacent major and minor side surfaces; and a peripheral edge formed at the intersection of each end surface and the peripheral side surface, two sections of each peripheral edge constituting cutting edges;

each end surface having four corners, two diagonally opposed lowered corners and two diagonally opposed raised corners, the lowered corners being closer to a median plane of the cutting insert than the raised corners;

each cutting edge comprising a major cutting edge formed by the intersection of a given major side surface with a given end surface;

each end surface being provided with an abutment member having an abutment surface;

wherein, in each cross section of the cutting insert taken in a plane parallel to a minor plane of the cutting insert, the abutment surface of a particular end surface is closer to the median plane than a leading section of one of the major cutting edges of the particular end surface.

Typically, the leading section of each major cutting edge extends from adjacent a respective raised corner to at least the minor plane.

Preferably, each cutting edge further comprises a minor cutting edge and a corner cutting edge formed, respectively, by the intersection of minor and corner side surfaces with either end surface.

Further preferably, the two end surfaces have 180° rotational symmetry about a first axis passing therethrough.

Yet further preferably, the major side surfaces have 180° rotational symmetry about a second axis passing therethrough, the second axis being perpendicular to the first axis.

Yet further preferably, the two minor side surfaces have 180° rotational symmetry about a third axis passing therethrough, the third axis being perpendicular to the first axis and the second axis.

If desired, each minor side surface is divided into two minor side sub-surfaces by a major plane along a join where the major plane intersects the minor side surface, each minor side sub-surface extending away from the join at an angle α with respect to a plane passing through the join and parallel to the minor plane.

Generally, the angle α is in the range of one to two degrees.

In accordance with the present invention, in an end-view of the cutting insert the abutment surface is elongated in form having two long edges extending between two short edges.

Preferably, the two short edges are substantially parallel.

Further preferably, a larger portion of one of the two short edges is located on one side of the major plane and a larger portion of the other one of the two short edges is located on the opposite side of the major plane.

There is also provided in accordance with the present invention, a milling cutter comprising:
- at least one cutting insert in accordance with the present invention; and
- a cutter body having at least one insert pocket in which the at least one cutting insert is retained, the at least one insert pocket comprising adjacent side and rear walls generally transverse to a base, the rear wall being generally convex; the side wall being provided with an axial location surface that abuts a given minor side surface of the at least one cutting insert at a given axial abutment region; the rear wall being provided with two protruding tangential location surfaces, located on either side of a central region of the rear wall, a first of the two tangential location surfaces abuts a first tangential abutment surface located on the abutment surface of the at least one cutting insert, a second of the two tangential location surfaces abuts a second tangential abutment surface located on the abutment surface.

In accordance with the present invention, the given axial abutment region is located on a forward region of a radially outer minor side sub-surface of the given minor side surface, the forward region being distal the rear wall of the insert pocket.

Further in accordance with the present invention, the first and second tangential abutment surfaces are located on opposite sides of the minor plane.

BRIEF DESCRIPTION OF THE DRAWINGS

For a better understanding, the invention will now be described, by way of example only, with reference to the accompanying drawings in which.

DETAILED DESCRIPTION OF THE INVENTION

Attention is first drawn to FIGS. 1 to 5, showing a cutting insert 10 in accordance with the present invention there. The cutting insert 10 is tangential and indexable, and is typically manufactured by form-pressing and sintering carbide powders. The cutting insert 10 is generally rectangular in an end view and has two identical opposing end surfaces 12. Each end surface 12 has 180° rotational symmetry about a first axis A1 passing through the two end surfaces 12.

Figure 1:
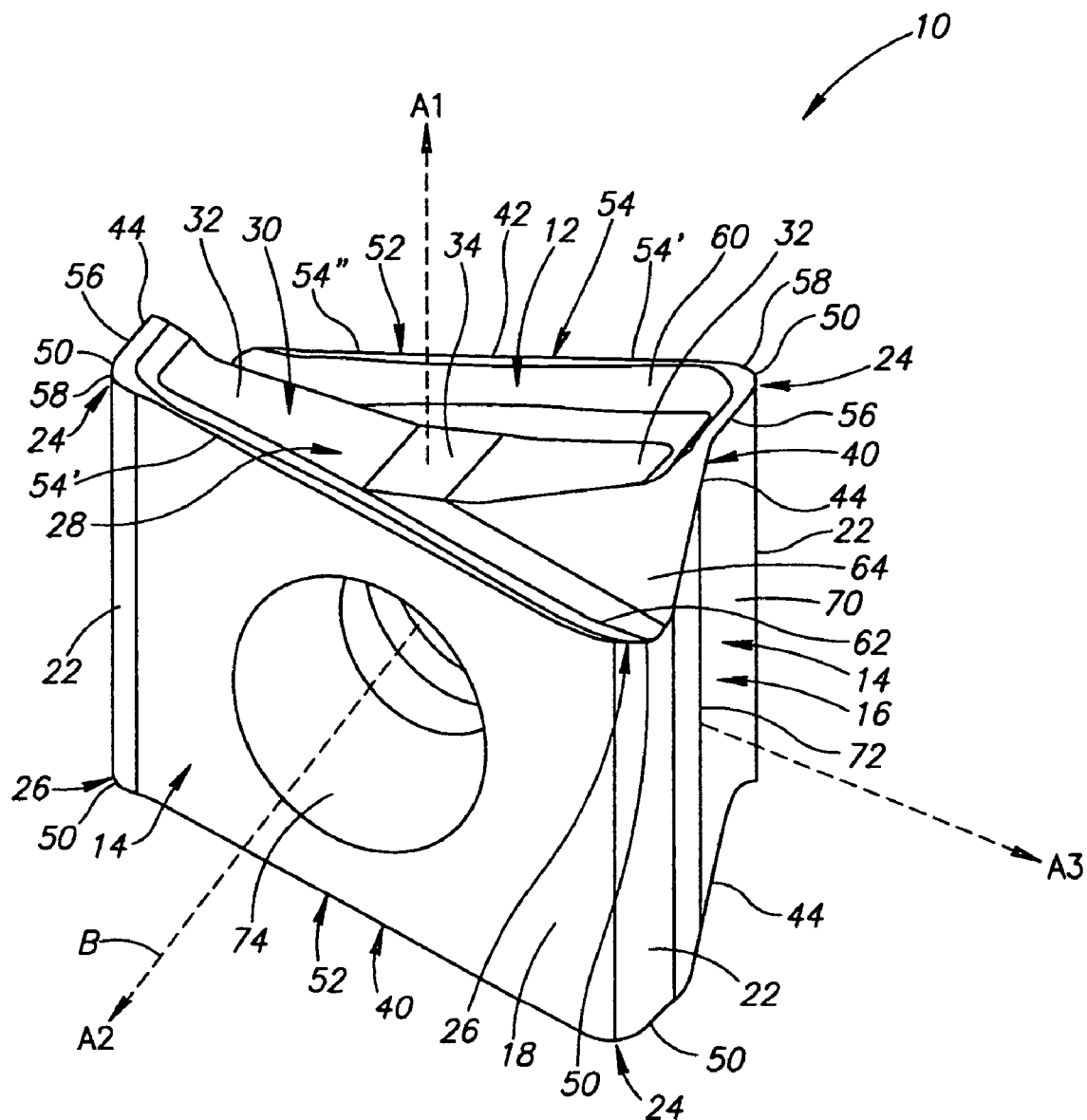
FIG. 1 is a perspective view of a cutting insert in accordance with the present invention.
Figure 2:
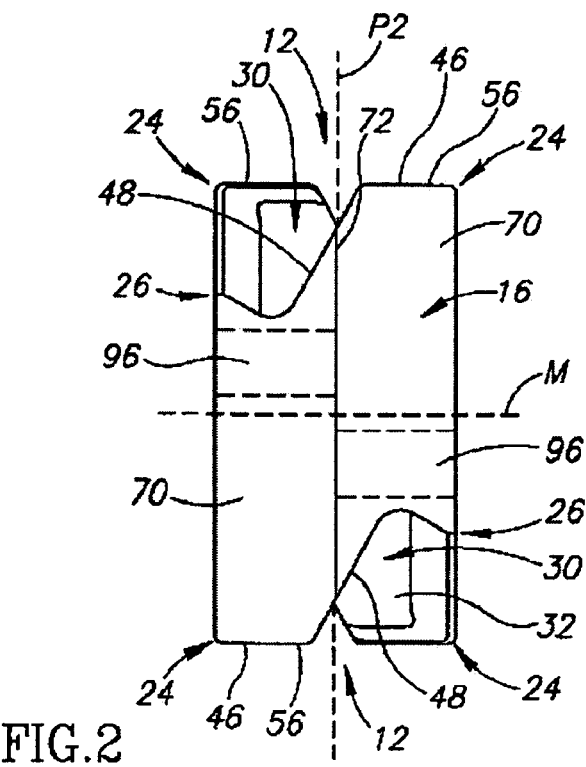
FIG. 2 is a first side view of the cutting insert in FIG. 1.

A peripheral side surface 14 extends between the two opposing end surfaces 12 and comprises two opposed identical minor side surfaces 16, two opposed identical major side surfaces 18, and four opposed corner side surfaces 22. Each pair of adjacent minor and major side surfaces 16, 18 merge at a common corner side surface 22. The two identical opposing major side surfaces 18 each have 180° rotational symmetry about a second axis A2 which is perpendicular to the first axis A1 and passes through the opposing major side surfaces 18. Similarly, the two identical opposing minor side surfaces 16 each have 180° rotational symmetry about a third axis A3 passing through the opposing minor side surfaces 16. The third axis A3 is perpendicular to the first axis A1 and to the second axis A2. A minor plane P1 of the cutting insert is defined by the first axis A1 and the second axis A2, a major plane P2 of the cutting insert 10 is defined by the first axis A1 and the third axis A3 and a median plane M is defined by the second axis A2 and the third axis A3. A comparison of FIGS. 2, 3 and 4 shows that the two opposing end surfaces 12 differ in shape from both the minor side surfaces 16 and the major side surfaces 18, and the minor side surfaces 16 differ in shape from the major side surfaces 18.

Each end surface 12 has four corners, two diagonally opposed lowered corners 24 and two diagonally opposed raised corners 26. The lowered corners 26 are closer to the median plane M than the raised corners 24. Each corner side surface 22 extends between a given raised corner 26 of one of the two opposing end surfaces 12 and a given lowered corner 26 of the other of one of the two opposing end surfaces 12. Each end surface 12 is provided with an abutment member 28 having an abutment surface 30 which is generally concave or V-shaped in form. In accordance with a preferred embodiment the abutment surface 30 comprises three generally flat portions, two outer portions 32 with an inner portion 34 therebetween.

Figure 3:
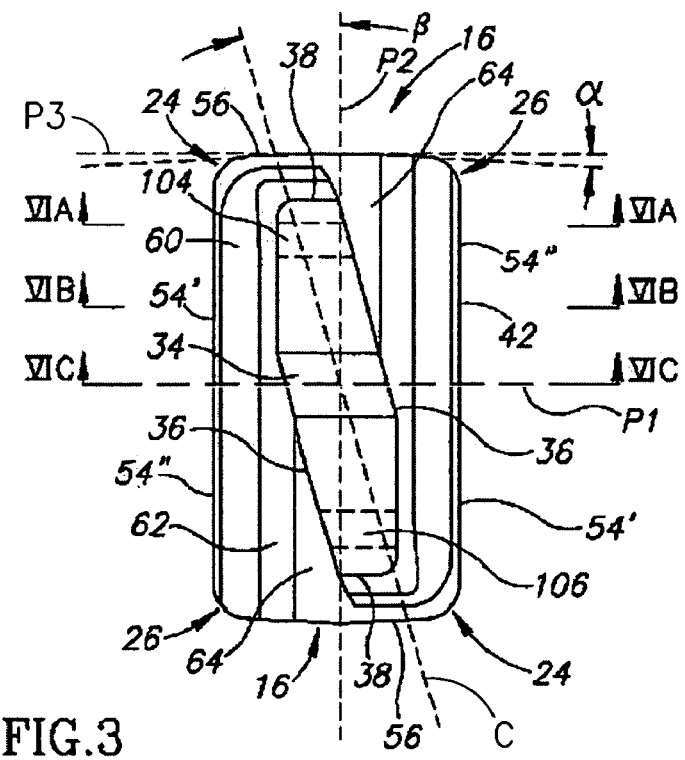
FIG. 3 is an end view of the cutting insert shown in FIG. 1.
Figure 4:
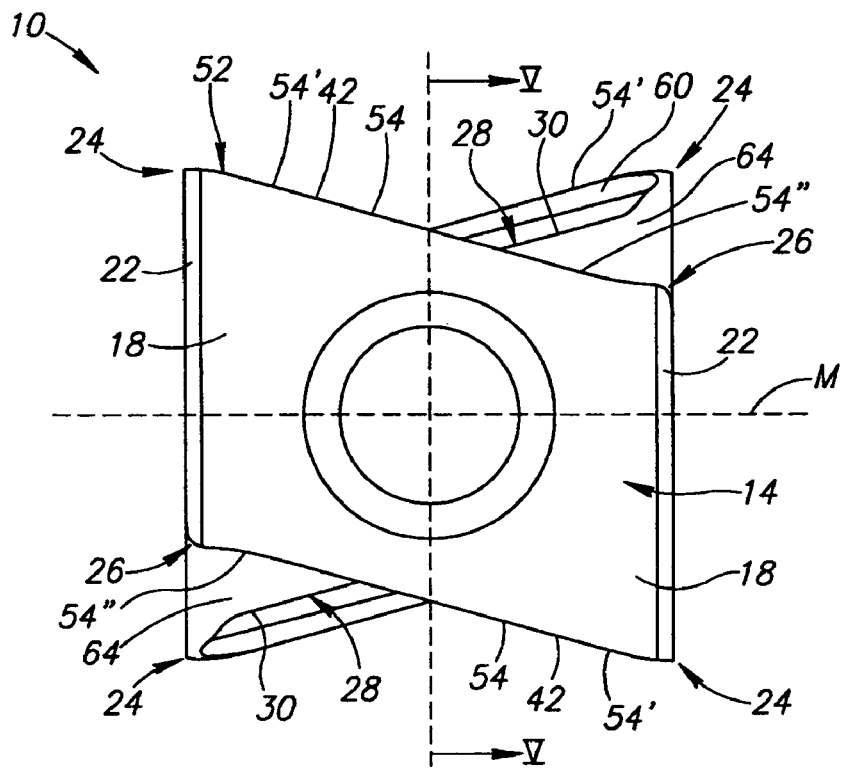
FIG. 4 is a second side view of the cutting insert shown in FIG. 1.
Figure 5:
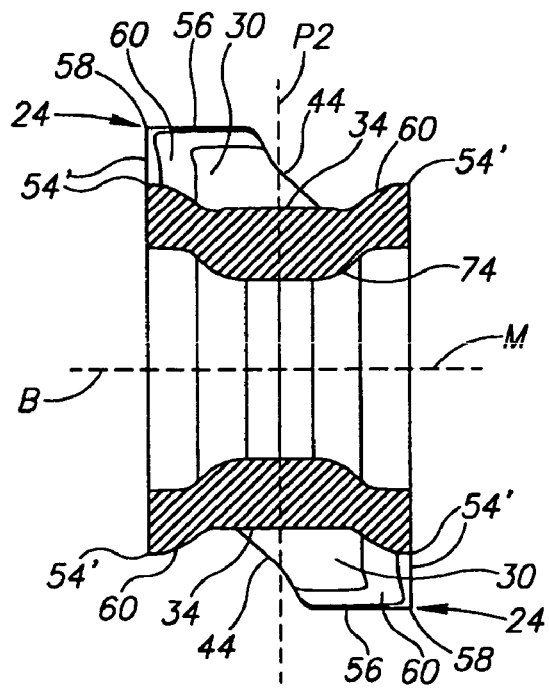
FIG. 5 is a cross-sectional view of the cutting insert shown in FIG. 1 taken along V—V in FIG. 4.

Referring to FIG. 3, it can be seen that in an end-view of the cutting insert 10 the abutment surface 30 has the form of a distorted parallelogram, having two long edges 36 extending between two short edges 38. Therefore, each outer flat portion 32 of the abutment surface 30, extends from a respective short edge 38 to the inner flat portion 34. The two short edges 38 are preferably substantially parallel to each other. As can be seen in FIG. 3, in an end view of the cutting insert 10, a longitudinal axis C of the abutment member 28 makes an acute angle β with the major plane P2, so that the two short edges 38 are substantially located on opposite sides of the major plane P2. In other words, a larger portion of one of the two short edges 38 is located on one side of the major plane P2 and a larger portion of the other one of the two short edges 38 is located on the opposite side of the major plane.

A peripheral edge 40 is formed at the intersection of each end surface 12 and the peripheral side surface 14. For each end surface 12, the peripheral edge 40 comprises two major edges 42, formed by the intersection of the major side surfaces 18 with the end surface 12; two minor edges 44, formed by the intersection of the minor side surfaces 16 with the end surface 12; and two corner edges 50, formed by the intersection of the corner side surfaces 22 with the end surface 12.

In the cutting insert 10 of the present invention at least two sections of each peripheral edge 40 constitute cutting edges 52. Each cutting edge 52 comprises a major cutting edge 54, extending from a respective raised corner 24 along substantially the whole length of its associated major edge 42; a minor cutting edge 56, extending along at least half of the length of its associated minor edge 44; and a corner cutting edge 58, associated with a raised corner 24 and at which the major and minor cutting edges 54, 56 merge. Adjacent each cutting edge 52 in the end surfaces 12 is a rake surface 60 along which chips, removed from a workpiece during a milling operation, flow. A leading section 54' of each major cutting edge 54 extends from adjacent a respective raised corner 24 to at least the minor plane P1 and a trailing section 54" extends from the leading section 54' to a respective lowered corner 26. Between the rake surface 60 adjacent the trailing section 54" and the abutment member 28 there is a chip groove 62. The portion of the abutment member 28 adjacent the chip forming groove 62 constitutes a chip deflector 64.

Referring to FIG. 2, it is seen that each minor side surface 16 is divided into two minor side sub-surfaces 70 by a join 72 where the major plane P2 intersects the minor side surface 16. Each minor side sub-surface 70 extends away from the join 72 at an acute angle α with respect to a plane P3 passing through the join 72 and parallel to the minor plane P1. In accordance with a specific application this angle is approximately 1.5°. The cutting insert is provided with a through bore 74 extending between the major side surfaces 18 and having a bore axis B coinciding with the second axis A2.

Figure 6A:
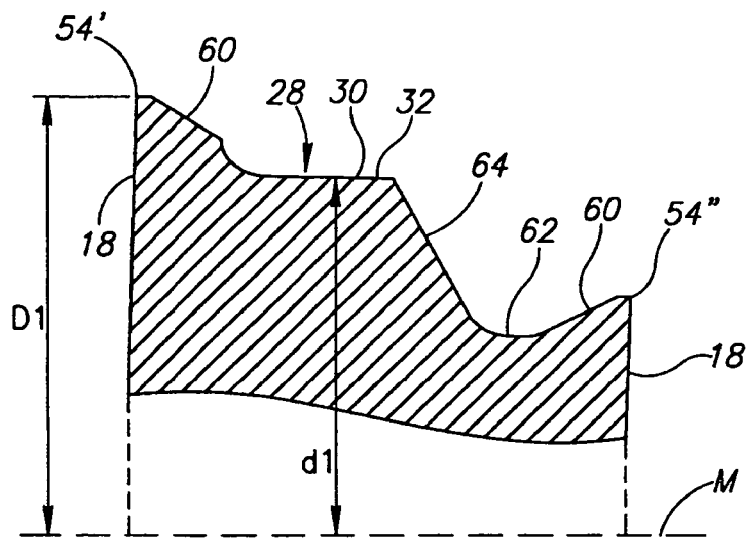
FIG. 6A is a partial cross section of the cutting insert shown in FIG. 1 taken along VIA—VIA in FIG. 3.
Figure 6B:
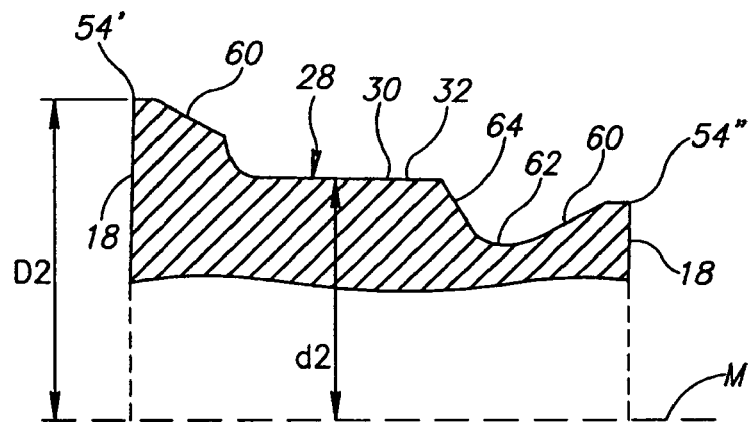
FIG. 6B is a partial cross section of the cutting insert shown in FIG. 1 taken along VIB—VIB in FIG. 3.
Figure 6C:
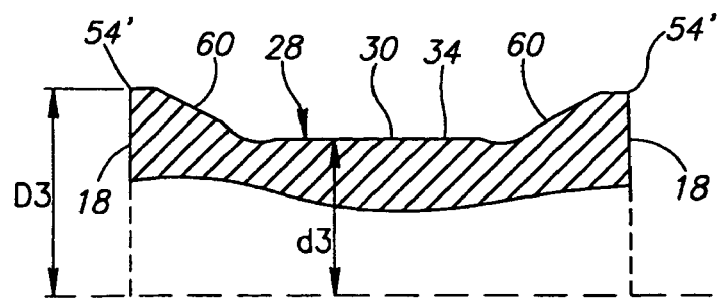
FIG. 6C is a partial cross section of the cutting insert shown in FIG. 1 taken along VIC—VIC in FIG. 3.

As can be seen in FIGS. 6A to 6C, in each cross section of the cutting insert taken in a plane parallel to the minor plane P1 of the cutting insert 10, the abutment surface 30 of a particular end surface 12 is closer to the median plane M than a leading section 54' of one of the major cutting edges 54 of the particular end surface 12. For example, in the cross section shown in FIG. 6A, the leading section 54' of the major cutting edge 54 to the left of the figure, is located at a distance D1 from the median plane M, whereas, the respective abutment surface 30 is located at a distance d1, where D1 is greater than d1. Similarly, in the cross section shown in FIG. 6B, the leading section 54' of the major cutting edge 54 is located at a distance D2 from the median plane M, whereas, the abutment surface 30 is located at a distance d2, where D2 is greater than d2. Similarly, in the cross section shown in FIG. 6C, taken at the location of the minor plane P1, the leading section 54' of the major cutting edge 54 is located at a distance D3 from the median plane M, whereas, the abutment surface 30 is located at a distance d3, where D3 is greater than d3. In other words, the abutment member 28 in the region of the leading section 54' of major cutting edge 54 and up to, and a little beyond the minor plane P1 (as can be seen in FIG. 4), does not protrude above the major cutting edge 54. As a consequence, chips cut from a workpiece in the region leading section 54' of the major cutting edge 54 are well formed during a milling process. However, in the region of the trailing section 54" of the major cutting edge 54, the chip deflector 64 protrudes above the major cutting edge 54 (as can be seen in FIG. 4 and on the right hand side of FIGS. 6A and 6B), which can disturb the development of the chips.

In order to reduce the influence of the chip deflector 64 in the region of the trailing section 54", the abutment member 28 is designed to be more distant from the major cutting edge 54 in the region of the trailing section 54" than it is in the region of the leading section 54'. Consequently, as described above, in an end view of the cutting insert 10, the longitudinal axis C of the abutment member 28 makes an acute angle β with the major plane P2, Although the shape of the major cutting edge 54 is shown in FIG. 4 to be generally straight in a side view, it can have any desired shape as long as it generally slopes downwardly from the raised corner 24 to the lowered corner 26. With reference to FIG. 2, it can be seen that in a side view of the minor side surface 16, the minor edge 44 is clearly divided into two sections, a first section 46 extending from the raised corner 24 to a little way before the major plane P2 and a second section 48 extending from the first section 46 to the lowered corner 26. The first section 46 is approximately straight and is perpendicular to the major side surface 18 in a side view (see FIG. 2) and is oriented at the angle α with respect to the plane P3 in an end view (see FIG. 3). The second section 48 extends from adjacent the major plane P2 slopingly towards the lowered corner 26 in a side view (see FIG. 2) and is oriented at the angle α with respect to the plane P3 in an end view (see FIG. 3). It is the first section 46 of the minor edge 44 that forms the minor cutting edge 56.

Figure 7:
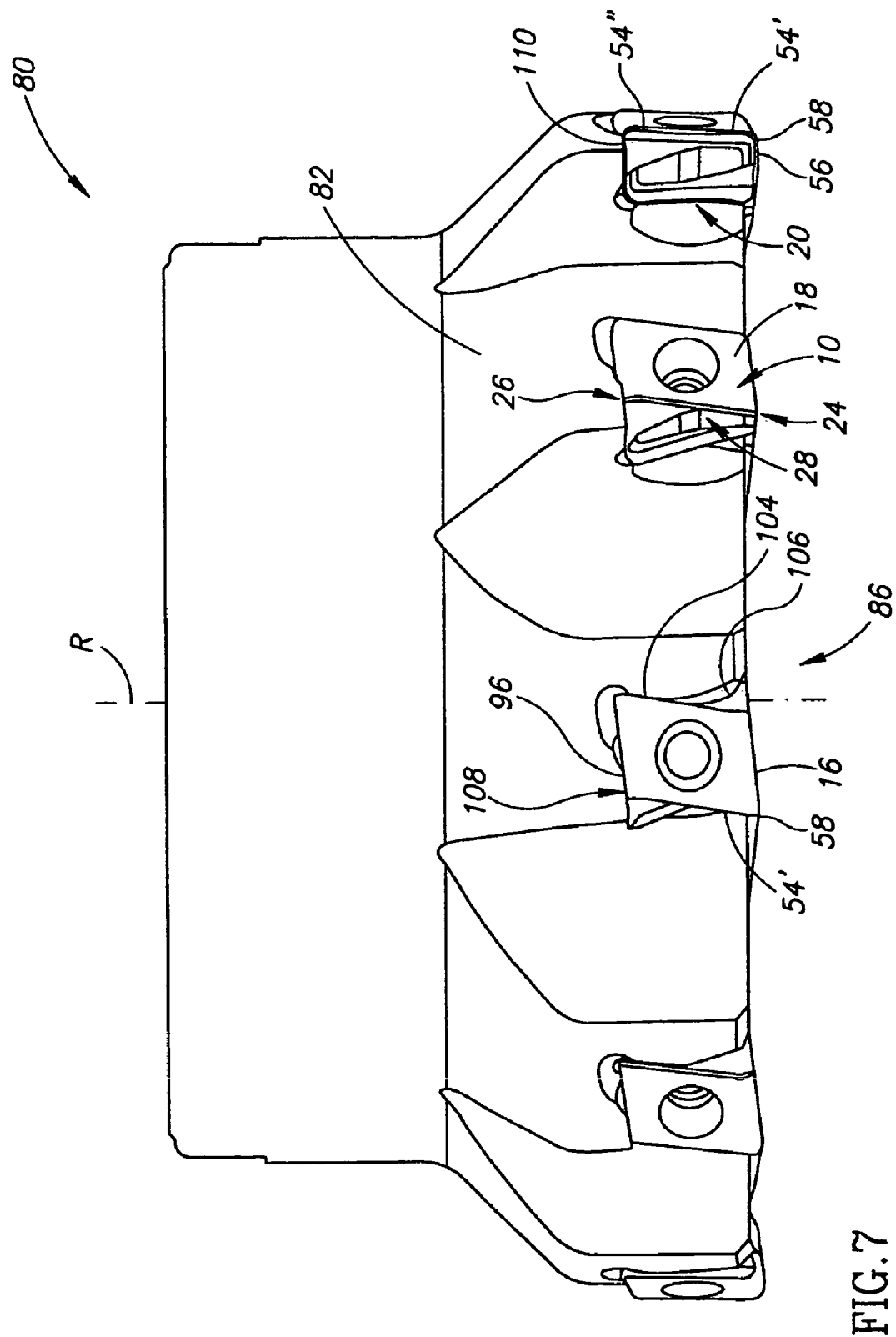
FIG. 7 is a perspective view of a milling cutter in accordance with the present invention.
Figure 8:
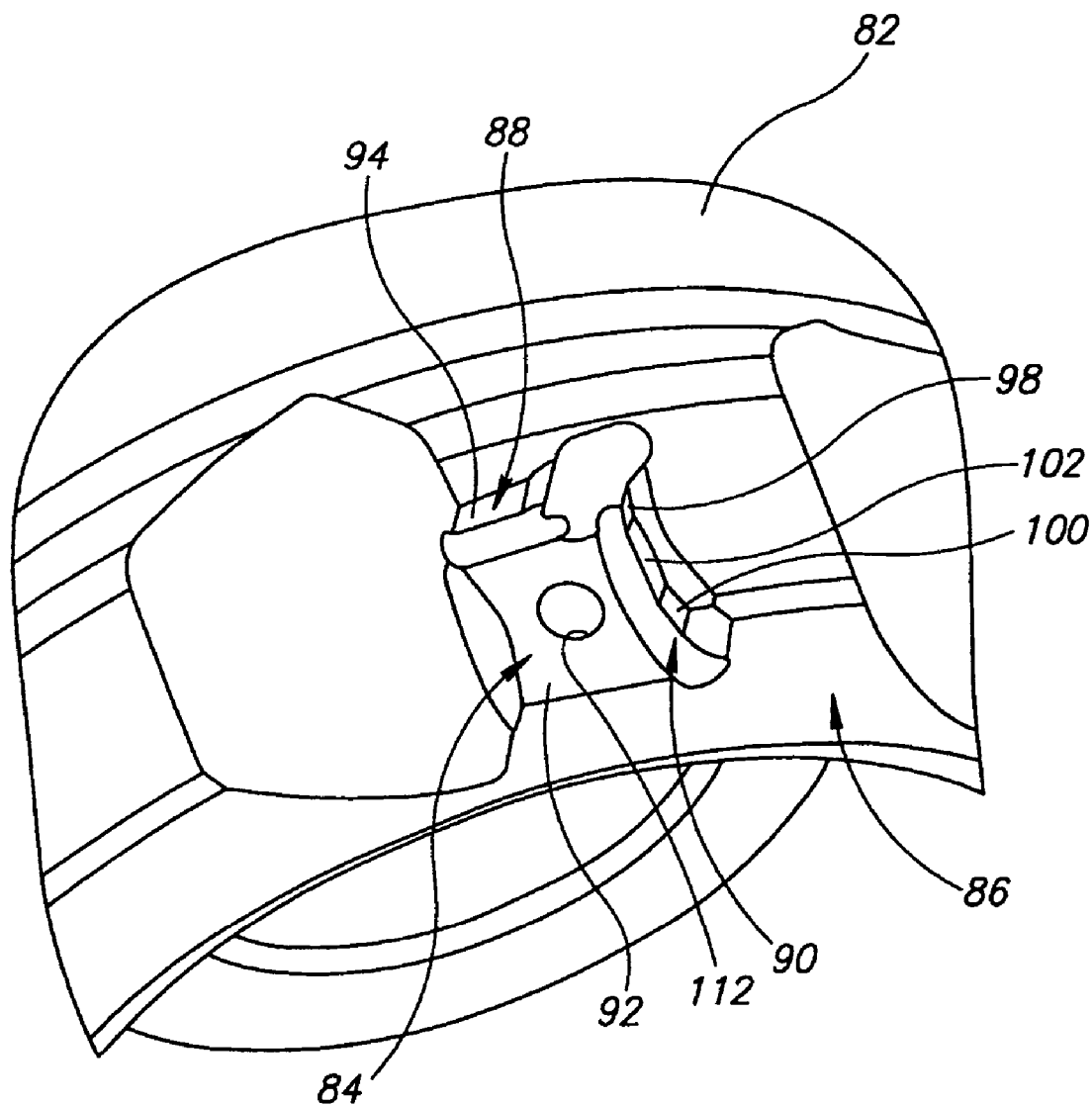
FIG. 8 is a perspective view of a portion of the cutter body of the milling cutter in accordance with the present invention, showing in detail an insert pocket.

Attention is now drawn to FIG. 7, showing a milling cutter 80 with an axis of rotation R, having a cutter body 82 provided with a plurality of insert pockets 84. In each insert pocket 84 a cutting insert 10 in accordance with the present invention is clamped by means of a clamping screw (not shown). The axial rake angle will generally be in the range of 5° to 20°. As can be seen, each cutting insert is seated so that there will be a clearance between a workpiece (not shown) and the cutting insert's minor side surface 16 adjacent the milling cutter's face 86. The structure of the insert pocket 84 is shown in detail in FIG. 8. The insert pocket 84 comprises adjacent side and rear walls 88, 90 generally transverse to a base 92.

The rear wall 90 is generally convex and the side wall 88 is provided with an axial location surface 94 for abutting a given minor side surface 16 of the cutting insert 10 at an axial abutment region 96. The rear wall 90 is provided with two protruding tangential location surfaces, an upper tangential location surface 98, adjacent the pocket side wall 88 and a lower tangential location surface 100. The two tangential location surfaces are located on either side of a central region 102 of the rear wall 90. The upper tangential location surface 98 abuts an upper tangential abutment surface 104 located on the abutment surface 30 of the cutting insert 10. The lower tangential location surface 100 abuts a lower tangential abutment surface 106 located on the abutment surface 30. Clearly, the terms "lower" and "upper" used here with respect to the abutment surface 30 are used only when the cutting insert 10 is mounted in the milling cutter 80, and with respect to the orientation shown in FIG. 7. Similarly, with respect to FIG. 7, the axial abutment region 96 is located on a forward region 108 of a radially outer minor side sub-surface 110, the forward region being distal the rear wall of the insert pocket 90.

As can be seen in FIG. 3, the two tangential abutment surfaces 104, 106 on each abutment surface 30 are located on opposite sides of the minor plane P1. As can be seen in FIG. 2, each minor side sub-surface 70 is provided with one axial abutment region 96 adjacent a lowered corner 26. The base 92 of the insert pocket 84 is provided with a threaded bore 112 for receiving a clamping screw in order to secure the cutting insert 10 in the insert pocket 84. When the cutting insert 10 is secured in the insert pocket 84, a radially inner major side surface 20 will abut the base 92 of the insert pocket 84. Preferably, the major side surfaces 18 of the cutting insert 10 are ground. Further preferably, the minor side sub-surfaces 70 are ground. With these surfaces ground, good positioning of the cutting insert 10 in the insert pocket 84 is ensured.

Although the present invention has been described to a certain degree of particularity, it should be understood that various alterations and modifications could be made without departing from the spirit or scope of the invention as hereinafter claimed.

What is claimed is:

1. A tangential cutting insert, for use in a milling cutter, comprising:
    two identical opposing end surfaces of a generally rectangular shape in an end view of the cutting insert;
    a peripheral side surface extending between the two opposing end surfaces, the peripheral side surface comprising two identical opposing major side surfaces of a generally parallelogrammatic shape, two opposing minor side surfaces and corner side surfaces located between adjacent major and minor side surfaces; and
    a peripheral edge formed at the intersection of each end surface and the peripheral side surface, two sections of each peripheral edge constituting cutting edges;
    each end surface having four corners, two diagonally opposed lowered corners and two diagonally opposed raised corners, the lowered corners being closer to a median plane M of the cutting insert than the raised corners;
    each cutting edge comprising a major cutting edge formed by the intersection of a given major side surface with a given end surface;
    each end surface being provided with an abutment member having an abutment surface;
    wherein, in each cross section of the cutting insert taken in a plane that is parallel to a minor plane P1 of the cutting insert and passes through both a leading section of a major cutting edge and an abutment surface associated with a particular end face, the abutment surface is closer to the median plane M than the leading section; and
    wherein the end surfaces differ in shape from both the minor side surfaces and the major side surfaces.

2. The cutting insert according to claim 1, wherein the leading section of each major cutting edge extends from adjacent a respective raised corner to at least the minor plane P1.

3. The cutting insert according to claim 1, wherein each cutting edge further comprises a minor cutting edge and a corner cutting edge formed, respectively, by the intersection of minor and corner side surfaces with either end surface.

4. The cutting insert according to claim 1, wherein the two end surfaces have 180° rotational symmetry about a first axis A1 passing therethrough.

5. The cutting insert according to claim 4, wherein the major side surfaces have 180° rotational symmetry about a second axis A2 passing therethrough, the second axis A2 being perpendicular to the first axis A1.

6. The cutting insert according to claim 5, wherein the two minor side surfaces 180° rotational symmetry about a third axis A3 passing therethrough, the third axis A3 being perpendicular to the first axis A1 and the second axis A2.

7. The cutting insert according to claim 1, wherein each minor side surface is divided into two minor side sub-surfaces by a major plane P2 along a join between the two minor side sub-surfaces of each minor side surface where the major plane P2 intersects the minor side surface, each minor side sub-surface extending away from the join at an angle α with respect to a plane P3 passing through the join and parallel to the minor plane P1.

8. The cutting insert according to claim 7, wherein the angle α is in the range of one to two degrees.

9. The cutting insert according to claim 1, wherein in an end-view of the cutting insert the abutment surface is elongated in form having two long edges extending between two short edges.

10. The cutting insert according to claim 9, wherein the two short edges are substantially parallel.

11. The cutting insert according to claim 9, wherein a larger portion of one of the two short edges is located on one side of a major plane P2 and a larger portion of the other one of the two short edges is located on the opposite side of the major plane P2.

12. A milling cutter comprising:
    a cutting insert comprising:
        two identical opposing end surfaces of a generally rectangular shape in an end view of the cutting insert;
        a peripheral side surface extending between the two opposing end surfaces, the peripheral side surface comprising two identical opposing major side surfaces of a generally parallelogrammatic shape, two opposing minor side surfaces and corner side surfaces located between adjacent major and minor side surfaces; and
        a peripheral edge formed at the intersection of each end surface and the peripheral side surface, two sections of each peripheral edge constituting cutting edges;
        each end surface having four corners, two diagonally opposed lowered corners and two diagonally opposed raised corners, the lowered corners being closer to a median plane M of the cutting insert than the raised corners;
        each cutting edge comprising a major cutting edge formed by the intersection of a given major side surface with a given end surface;
        each end surface being provided with an abutment member having an abutment surface;
        wherein, in each cross section of the cutting insert taken in a plane that is parallel to a minor plane P1 of the cutting insert and passes through both a leading section of a major cutting edge and an abutment surface associated with a particular end face, the abutment surface is closer to the median plane M than the leading section; and
        wherein the end surfaces differ in shape from both the minor side surfaces and the major side surfaces; and
    a cutter body having at least one insert pocket in which the at least one cutting insert is retained, the at least one insert pocket comprising adjacent side and rear walls generally transverse to a base, the rear wall being generally convex; the side wall being provided with an axial location surface tat abuts a given minor side surface of the at least one cutting insert at a given axial abutment region; the rear wall being provided with two protruding tangential location surfaces, located on either side of a central region of the rear wall, a first of the two tangential location surfaces abuts a first tangential abutment surface located on the abutment surface of the at least one cutting insert, a second of the two tangential location surfaces abuts a second tangential abutment surface located on the abutment surface.

13. The milling cutter according to claim 12, wherein the given axial abutment region is located on a forward region of a radially outer minor side sub-surface of the given minor side surface, the forward region being distal the rear wall of the insert pocket.

14. The milling cutter according to claim 12, wherein the first and second tangential abutment surfaces are located on opposite sides of the minor plane P1.

15. A tangential cutting insert comprising:
  two identical opposing end surfaces, each end surface having four corners, two diagonally opposed lowered corners and two diagonally opposed raised corners, the lowered corners being closer to a median plane M of the cutting insert than the raised corners, each end surface being provided with an abutment member having an abutment surface;
  a peripheral side surface extending between the two opposing end surfaces, the peripheral side surface comprising two identical opposing major side surfaces and two opposing minor side surfaces; and
  a peripheral edge formed at the intersection of each end surface and the peripheral side surface;
    wherein, in each cross section of the cutting insert taken in a plane that is parallel to a minor plane P1 of the cutting insert and passes through both a leading section of a major cutting edge and an abutment surface associated with a particular end face, the abutment surface is closer to the median plane M than the leading section; and
  wherein the end surfaces differ in shape from both the minor side surfaces and the major side surfaces.

16. The cutting insert according to claim 15, wherein the two end surfaces have 180° rotational symmetry about a first axis A1 passing therethrough.

17. The cutting insert according to claim 16, wherein the major side surfaces have 180° rotational symmetry about a second axis A2 passing therethrough, the second axis A2 being perpendicular to the first axis A1.

18. The cutting insert according to claim 17, wherein the two minor side surfaces have 180° rotational symmetry about a third axis A3 passing therethrough, the third axis A3 being perpendicular to the first axis A1 and the second axis A2.

19. The cutting insert according to claim 15, wherein each minor side surface is divided into two minor side sub-surfaces by a major plane P2 along a join between the two minor side sub-surfaces of each minor side surface where the major plane P2 intersects the minor side surface, each minor side sub-surface extending away from the join at an angle $\alpha$ with respect to a plane P3 passing through the join and parallel to the minor plane P1.

20. The cutting insert according to claim 19 wherein the angle $\alpha$ is in the range of one to two degrees.

21. The cutting insert according to claim 15, wherein in an end-view of the cutting insert the abutment surface is elongated in form having two long edges extending between two short edges.

22. The cutting insert according to claim 21, wherein the two short edges are substantially parallel.

23. The cutting insert according to claim 21, wherein a larger portion of one of the two short edges is located on one side of a major plane P2 and a larger portion of the other one of the two short edges is located on the opposite side of the major plane P2.

* * * * *